No. 74,870.   PATENTED FEB. 25, 1868.
P. A. WHITNEY.
DRILL AND COUNTERSINK.
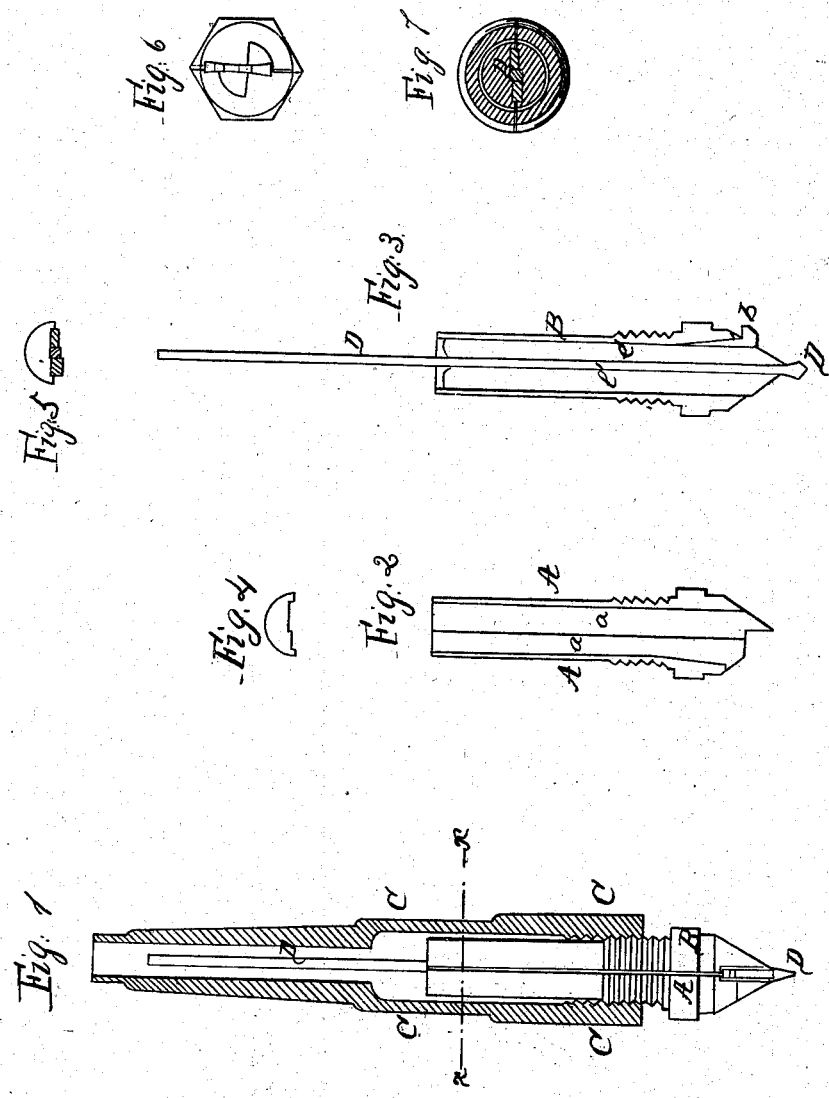

United States Patent Office.

P. A. WHITNEY, OF WOODSTOCK, VERMONT.

Letters Patent No. 74,870, dated February 25, 1868.

---

IMPROVEMENT IN DRILL AND COUNTERSINK.

---

The Schedule referred to in these Letters Patent and making part of the same.

---

TO ALL WHOM IT MAY CONCERN:

Be it known that I, P. A. WHITNEY, of Woodstock, in the county of Windsor, and State of Vermont, have invented a new and improved Drill and Countersink; and I do hereby declare that the following is a full, clear, and exact description thereof, which will enable others skilled in the art to make and use the same, reference being had to the accompanying drawings, forming part of this specification.

This invention relates to a new and improved method of constructing drills and countersinks, whereby they are combined in the same tool, are more simple in their construction, and more certain in their operation.

It consists in the countersink being in two parts, with the drill between the same keyed in such way in splines in the chuck as that the same are adjustable, the chuck being screwed into the lathe-socket, so that the two segments of the same are forced firmly together, thereby holding the drill and countersink firmly in the chuck.

It consists also in one of the splines in the same segment of the chuck being deeper than the other, and deeper also than the opposite spline in the other segment of the chuck, whereby the cutting-edge of countersink is brought into the proper position for cutting a countersink. In the accompanying plate of drawings—

Figure 1 is a side view of my invention, part of the socket being broken away to show the construction.

Figure 2 is one segment of the chuck.

Figure 3 is the same, showing the countersink and drill in position.

Figure 4 is an end view of one segment of the chuck.

Figure 5 is the same, with the drill and countersink in position.

Figure 6 is an end view of my invention.

Figure 7 is a cross-section of the same, taken in the line $x\,x$, fig. 1.

Similar letters of reference indicate corresponding parts.

A is one segment of the chuck; B is the other segment of the same; C is the socket; $a$ is a spline in segment A; $a'$ is a deeper spline in the same; $e$ is the countersink; D is the drill; $b$ is the key or wedge. The socket C is made in the ordinary way, and is fitted into the live spindle of the lathe, and is provided on the inside, at the outer end, with a screw-thread to receive the chuck. The chuck is composed of the two segments A and B, as shown in the drawing, having a tapering shank on which is a screw-thread, as shown in the drawing, so as to fit the screw-thread in the inside of the socket C, by means of which the two segments of the chuck are forced firmly together, so as to hold the drill and countersink firmly in their places between the same. The chuck is formed upon the outside, near to the screw on the same, into a head having four or more sides to receive the wrench, by means of which the same is turned in the socket C. The chuck is turned down to a point at the outer end, as shown, and a portion of one side of each of the segments A and B is cut away on one side, as shown, so as to allow an escape for the chip made by the cutting of the countersink. On the inside or plane side of each of the segments A and B, are cut in a longitudinal direction, the entire length of the same, two splines or channels $a'$ and $a'$, being of equal width, but one spline being deeper than the other, so as that, when placed together, the deeper spline in one segment, A, will correspond with the shallower spline on the other segment, B. The countersink $e$ is made of steel in the two parts, of about the same length as the segments A and B are each of about one-sixteenth of an inch in thickness, or any other suitable thickness, so as to be a little thicker than the depth of a spline in one segment, A, and the opposite spline in the other segment, B, so as that, when the segments A and B are forced together, the countersink $e$ will be held firmly between. The countersink is formed tapering nearly to a point on the outside of the chuck, and each part of the same being brought to an edge in a direction opposite to the edge of the other. Between the two parts of the countersink $e$ is a square steel rod, of which the drill is formed. The spline $a'$ is wider at the front end, to receive the key $b$. The key $b$ is made of steel in the form of a wedge, the object of the same being to force the parts of the countersink $e$ and the drill D firmly together. The drill D is of the ordinary form, and may be of any required size.

The operation is readily seen from the drawings and the foregoing description.

Constructed as above described, it constitutes a convenient tool for the drilling and countersinking of holes, the advantage of which is, that the drill and countersink are easily adjusted to holes of any depth and to each other.

I claim as new, and desire to secure by Letters Patent—

1. An adjustable tool for the drilling and countersinking holes, composed of the countersink $e$ in two parts, and a drill, D, between the same, adjusted by a key or its equivalent, held between the segments A and B of my chuck, by being screwed into a socket, C, substantially as shown and described, and for the purposes set forth.

2. A chuck formed in segments, having two splines or channels, $a$ and $a'$, of different depths, in combination with any countersink, $e$, and drill D, substantially as shown and described, and for the purposes set forth.

P. A. WHITNEY.

Witnesses:
WM. J. BOYCE,
FRED. P. MARSH.